United States Patent [19]
Yamazaki

[11] Patent Number: 4,797,009
[45] Date of Patent: Jan. 10, 1989

[54] DYNAMIC PRESSURE AIR BEARING

[75] Inventor: Mutsuki Yamazaki, Yokohama, Japan

[73] Assignee: Kabushiki Kaisha Toshiba, Kawasaki, Japan

[21] Appl. No.: 101,996

[22] Filed: Sep. 28, 1987

[30] Foreign Application Priority Data

Sep. 30, 1986 [JP] Japan .................. 61-231861

[51] Int. Cl.$^4$ ............................. F16C 32/06
[52] U.S. Cl. .................. 384/100; 384/115; 384/907.1
[58] Field of Search ........... 384/100, 114–120, 384/286, 291, 292, 297, 907.1

[56] References Cited

U.S. PATENT DOCUMENTS

| | | | |
|---|---|---|---|
| 2,673,131 | 3/1954 | Kistler | 384/292 X |
| 2,980,475 | 4/1961 | Wolfe | 384/292 X |
| 3,284,144 | 11/1966 | Moore et al. | 384/100 X |
| 3,711,171 | 1/1973 | Orkin et al. | 384/907.1 X |
| 4,523,800 | 6/1985 | Yamashita et al. | 384/115 X |
| 4,538,081 | 8/1985 | Kamiya et al. | 384/115 X |

FOREIGN PATENT DOCUMENTS

| | | | |
|---|---|---|---|
| 3325984 | 2/1984 | Fed. Rep. of Germany | 384/114 |
| 94020 | 7/1980 | Japan | 384/100 |
| 15121 | 1/1982 | Japan | 384/100 |
| 87662 | 5/1984 | Japan | 384/7 |
| 61-19775 | 1/1986 | Japan . | |
| 61-19776 | 1/1986 | Japan . | |
| 1310524 | 3/1973 | United Kingdom | 384/100 |

Primary Examiner—Stuart S. Levy
Assistant Examiner—Thomas R. Hannon
Attorney, Agent, or Firm—Foley & Lardner, Schwartz, Jeffery, Schwaab, Mack, Blumenthal & Evans

[57] ABSTRACT

A dynamic pressure air bearing which comprises a sleeve member, with a shaft member arranged coaxially therein. Air is introduced through a clearance between the sleeve member and the shaft member by the rotation of either the sleeve member or the shaft member, and the dynamic pressure of the air acts on the inner surface of the sleeve member and the surface of the shaft member. Ceramics cover at least one of the inner surface of the sleeve member and the surface of the shaft member. The ceramics include at least one type selected from among SiN, SiCN, SiC, SiO, TiN, TiC, TiCN, BN, BC, BCN, Al$_2$O$_3$, WC, and diamond.

17 Claims, 8 Drawing Sheets

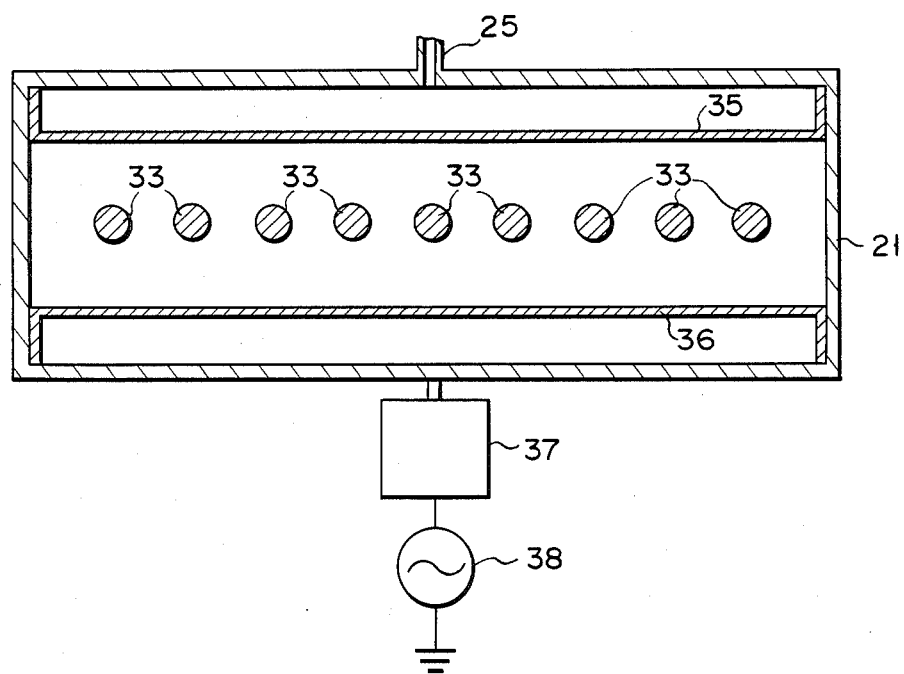
F I G. 4

DYNAMIC PRESSURE AIR BEARING

BACKGROUND OF THE INVENTION

I. Field of the Invention

The present invention relates to a dynamic pressure air bearing and, more particularly, to a dynamic pressure air bearing for use in a device, such as a laser scanner, having a high-precision rotating mechanism which rotates at high speed.

II. Prior Art

A laser scanner employs a mechanism which includes a rotating member which must be able to rotate at high speed (e.g., 10,000 rpm) and with high precision. The scanner, therefore, requires a bearing which can support the rotating member, allowing the rotating member to rotate at high speed with high precision for extended periods of time.

Ball bearings were used in the laser scanner. They require lubricant. The lubricant is scattered around when the rotating member rotates at such a high speed. Hence, ball bearings cannot be used in a laser scanner whose operation can be impaired by scattered lubricant. Further, ball bearings cannot allow the rotating member to rotate at speed as high as 10,000 rpm for an extended period of time, due to the inevitable wear of the balls of the bearings.

Dynamic pressure air bearings are often used in the high-speed rotation mechanism, to enable the rotating member to rotate at high speed for extended periods of time. A dynamic pressure air bearing comprises a fixed shaft with a surrounding sleeve. A groove is cut in the peripheral surface of the shaft. This groove extends obliquely to the axis of the shaft. When the sleeve is rotated at a high rated speed, air flows through the groove. The air serves as a lubricant because of its dynamic pressure. Hence, the sleeve can rotate without coming to contact with the fixed shaft. However, when the sleeve is rotating at a lower speed, such as at the start or at the end of rotation, the sleeve and the shaft rub against each other, and become worn. Therefore, the surface of the dynamic pressure portion of the shaft and the inner surface of the sleeve must be covered with a layer of harded stainless steel, superhard alloy or high-speed steel, or the like.

However, these hard metals are very expensive and also very hard to work. Further, with the dynamic pressure air bearing, there must be a clearance of several microns between the sleeve and the dynamic pressure portion of the shaft. Obviously, the bearing must be machined with high precision to have the designed structure. In other words, its parts must be accurately machined to the desired roundness and straightness. When the parts are made of hard metals of low workability, however, they cannot easily be machined to the required accuracy. The conventional dynamic pressure air bearing can, therefore, hardly be mass-produced. A dynamic pressure air bearing comprising a rotating shaft and a fixed sleeve cannot be mass-produced for the same reason, either.

SUMMARY OF THE INVENTION

An object of the present invention is to provide a dynamic pressure air bearing in which a shaft member and sleeve member do not wear and have excellent mass productivity and inexpensive cost.

According to the present invention, there is provided a dynamic pressure air bearing comprising a sleeve member, and a shaft member disposed coaxially in the sleeve member. Air is introduced to a clearance between the sleeve member and the shaft member when the sleeve member or the shaft member rotates, and the dynamic pressure of the air acts on the inner surface of the sleeve member and the surface of the shaft member. The dynamic pressure air bearing features in ceramics covered on at least one of the inner surface of the sleeve member and the surface of the shaft member.

The ceramics covered at least on one of the inner surface of the sleeve member and the surface of the shaft member comprise at least one element selected from the group consisting of Si, Ti, B, Al and W and at least one element selected from the group consisting of O, N and C. More particularly, the ceramics includes at least one selected from the group consisting of SiN, SiCN, SiC, SiO, TiN, TiC, TiCN, BN, BC, BCN, Al$_2$O$_3$, WC and diamond.

A method of covering with the ceramics may employ a plasma CVD, a thermal CVD, or a PVD such as a sputtering or an ion plating. The plasma CVD in which deposition can be performed at low temperatures and a good adhesion between a substrate and a film can be obtained, is most preferable since it prevents the coated member from deforming. In the plasma CVD, a power source for generating the plasma may be a high frequency microwave, or a direct current The plasma can be formed by utilizing an electron cyclotron resonance.

The material of the sleeve member and the shaft member may be an inexpensive material with high workability, such as stainless steel, cast iron, freecutting steel, and sintered material. When either one of the sleeve member and the shaft member is covered with the ceramics, the material of the member which is not covered with the ceramics may sometimes be limited according to the types of the ceramics to be covered. For example, when one member is covered with TiN, the material of the other member is preferably a material having high hardness such as high speed steel since Ti series ceramics have a trend of cutting the other member. However, since Si series ceramics such as SiN or SiC do not cut the other member, the material of the other member may employ any material, which is not only metal but also polymer such as Teflon (trade name) or Rulon (trade name).

The shaft member has a dynamic pressure portion of a diameter larger than the other portion, and a plurality of grooves are formed obliquely with respect to the axial direction of the shaft member on the surface of the dynamic pressure portion. The portion of the sleeve member opposed to the dynamic pressure portion is, on the other hand, formed with a sleeve portion of smaller inner diameter than the other portion. In this dynamic pressure air bearing, air is introduced to a clearance between the dynamic pressure portion and the sleeve portion through the grooves by the rotation of the shaft member or the sleeve portion, and the dynamic pressure of the flowing air acts on the surface of the dynamic pressure portion and the inner surface of the sleeve portion In this case, the axial length of the dynamic pressure portion is preferably longer than that of the sleeve portion. Thus, even if the sleeve member moves upward and downward by vibration during rotation, a constant dynamic pressure acts on the dynamic pressure portion and the sleeve portion, and both are thus not contacted with each other but can maintain smooth rotation.

The clearance between the dynamic pressure portion and the sleeve portion is preferably 2 to 10 microns.

The shaft member may be fixed, and the sleeve member may be rotated. Alternatively, the sleeve member may be fixed, and the shaft member may be rotated.

The dynamic pressure air bearing of the invention can be applied, for example, to the bearing of a polygonal mirror for a high speed scanner in a semiconductor laser beam printer. In this case, the polygonal mirror is mounted coaxially on the outer surface of the sleeve member.

With the dynamic pressure air bearing of the invention, at least one surface of the rotating shaft member or sleeve member which might be contacted when starting rotating or stopping rotating is covered with the ceramics. Therefore, even if the surfaces of the shaft member and the sleeve member are contacted and slid, the surfaces are prevented from being worn. On the other hand, the sleeve member and shaft member themselves can be formed of a material which is inexpensive and is easily worked. Thus, the dynamic pressure air bearing of the present invention has a long lifetime, excellent mass productivity, and is inexpensive.

BRIEF DESCRIPTION OF THE DRAWINGS

FIG. 4 is a cross-sectional view of the apparatus in FIG. 3;

DETAILED DESCRIPTION OF THE PREFERRED EMBODIMENTS

Figure 1:
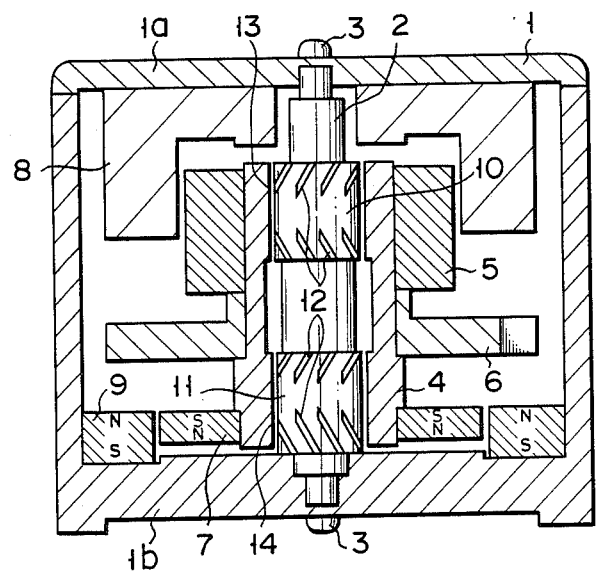
FIG. 1 is a sectional view showing a dynamic pressure air bearing according to one embodiment of the present invention.

Embodiments of the present invention will be described in more detail with reference to the accompanying drawings. FIG. 1 is a schematic view of a laser beam scanner provided with a dynamic pressure air bearing according to one embodiment of the invention.

In FIG. 1, fixed shaft 2 is disposed so that its axial direction is directed vertically in case 1. Shaft 2 is fixed by bolt 3 to ceiling plate 1a and bottom plate 1b of case 1. Sleeve member 4 is disposed around shaft 2 so that shaft 2 longitudinally penetrates sleeve member 4.

Cylindrical permanent magnet 5 is engaged fixedly on the upper outer peripheral surface of sleeve member 4. Polygonal mirror 6 is fixed to the central portion of the outer peripheral surface of sleeve member 4 so that the axis of mirror 6 coincides with that of sleeve member 4. Cylindrical permanent magnet 7 is engaged fixedly w th the outer peripheral surface of the lower end of sleeve member 4. Electromagnet 8 is fixed to the lower surface of ceiling plate 1 of case 1, and magnet 5 is inserted at a small interval to the lower portion of electromagnet 8. Cylindrical permanent magnet 9 is disposed on bottom plate 1b of case 1 at a small interval to magnet 7. From this description it becomes readily apparent that sleeve member 4 is rotatable relative to the shaft 2.

Upper dynamic pressure portion 10 and lower dynamic pressure portion 11 which are larger in diameter than the other portions are formed on shaft 2, and a plurality of grooves 12 inclined with respect to the axial direction are formed in the surfaces of upper and lower dynamic pressure portions 10 and 11. The portions of sleeve member 4 opposed to upper and lower dynamic pressure portions 10 and 11, i.e., upper sleeve portion 13 and lower sleeve portion 14 are formed smaller in inner diameters than the central portion. Clearances between upper dynamic pressure portion 10 and upper sleeve portion 13 and between lower dynamic pressure portion 11 and lower sleeve portion 14 are, for example, 3 to 6 microns.

At least one of the outer peripheral surfaces of upper and lower dynamic pressure portions 10 and 11 of shaft 2 and the inner peripheral surfaces of upper and lower sleeve portions 13 and 14 are coated with ceramics to be described later.

In the dynamic pressure air bearing constructed as described above, sleeve member 4 is floated at a predetermined position by the attracting force between magnets 7 and 9. When electromagnet 8 is energized, a magnetic force is applied circumferentially to magnet 5 as a core so that sleeve member 4 rotates. When sleeve member 4 thus rotates, air is introduced from grooves 13 formed in the surfaces of upper and lower dynamic pressure portions 10 and 11 of shaft 2 to clearance between upper and lower sleeve portions 13, 14 and upper and lower dynamic pressure portions 10, 11 so that the air acts as a lubricant, and sleeve member 4 rotates without contact with shaft 2. Accordingly, sleeve member 4 and shaft 2 are not worn even in high speed rotation as high as 1000 rpm. When sleeve member 4 starts rotating and stops rotating, upper and lower dynamic pressure portions 10, 11 contact upper and lower sleeve portions 13, 14, but at least one of both the contacting surfaces is covered with ceramics. The ceramics are hard to be hardly worn, and have low frictional coefficient, and even if there is no lubricating oil between upper and lower sleeve portions 13, 14 and upper and lower dynamic pressure portions 10, 11, the wear of the contacting surfaces are avoided.

Figure 2:
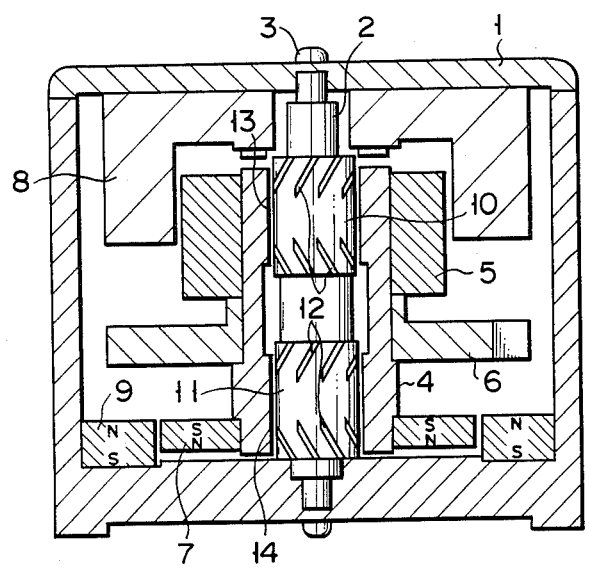
FIG. 2 is a sectional view showing a dynamic pressure air bearing according to another embodiment of the present invention.

FIG. 2 is a schematic view showing a dynamic pressure air bearing according to second embodiment of the present invention. In FIG. 2, the same reference numerals as in the first embodiment denote the same parts in the second embodiment, and the detailed description thereof will be omitted. In the second embodiment, upper and lower dynamic pressure portions 10, 11 of fixed shaft 2 are formed longer in axial length than upper and lower sleeve portions 13, 14 of sleeve member 4. Thus, even if sleeve member 4 slightly moves upward and downward by vibration during its rotation, predetermined dynamic pressure acts on upper and lower dynamic pressure portions 10, 11 and upper and lower sleeve portions 13, 14, and sleeve member 4 thus smoothly rotates. For example, even if sleeve member is swept to 5 to 50 Hz during its rotation to be vibrated by an acceleration of 0.3G, the fixed shaft and the sleeve member can smoothly rotate without contact.

Even when the sleeve member is formed of SUS416 and the inner wall of the sleeve member is covered with ceramics, the same advantages as those of the previous embodiments are provided. Further, both the fixed shaft and the sleeve members may be covered with the ceramics. In this case, the ceramics covered on the fixed shaft and on the sleeve member may be different. For example, the fixed shaft is covered with SiN and the sleeve member is covered with TiN, and vice versa.

Figure 3:
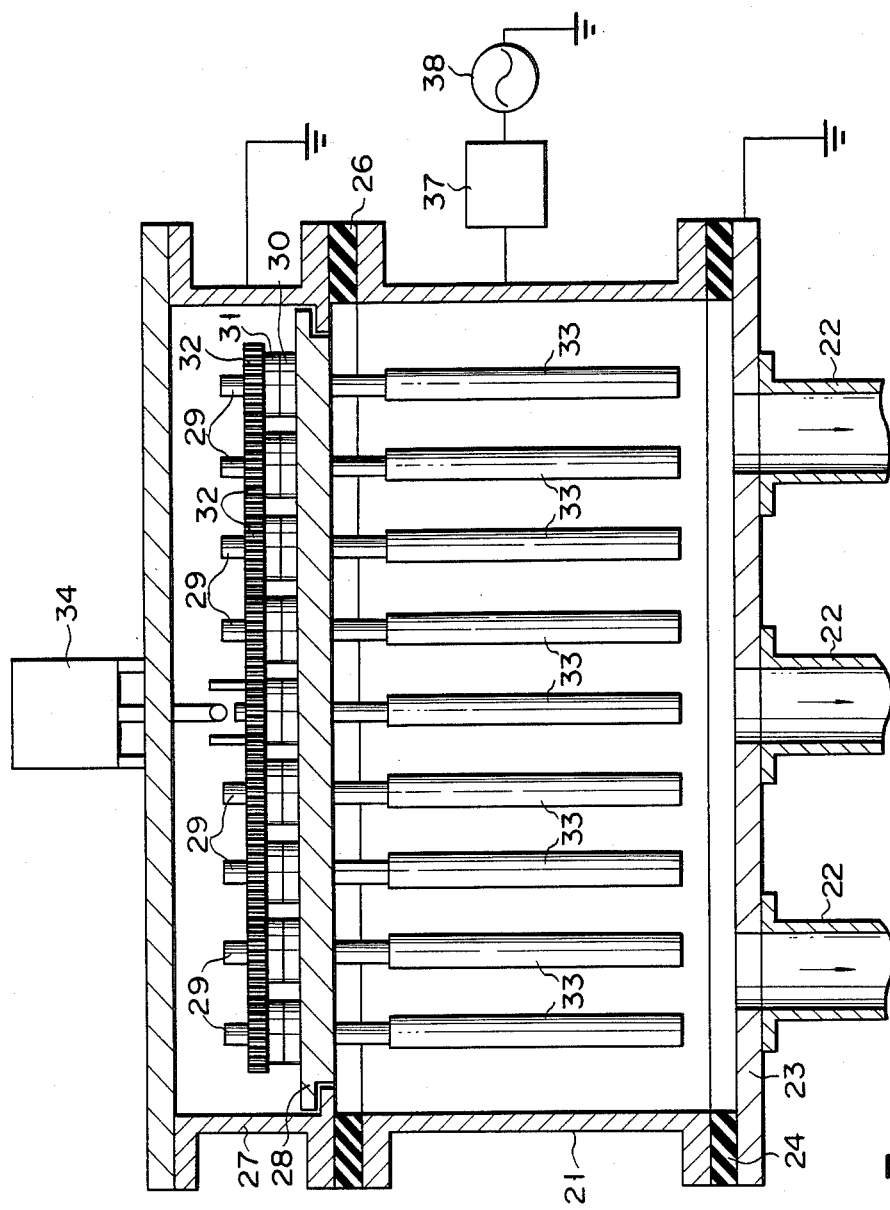
FIG. 3 is a longitudinal sectional view showing a ceramic coating apparatus for manufacturing the dynamic pressure air bearing of the invention, in which shaft members to be coated with ceramics are arranged in one row.

A ceramic coating apparatus for covering the dynamic pressure portions of the dynamic pressure air bearing with ceramics will be described. FIG. 3 is a side sectional view of the ceramic coating apparatus, and FIG. 4 is a plan sectional view of the apparatus. Bottom member 23 having a plurality of exhaust ports 22 is mounted through insulator 24 on the lower end of reaction chamber 21 having a square tubular shape. Reaction chamber 21 is evacuated by a mechanical booster pump and an oil rotary pump (not shown) through ports 22 so as to maintain approx. $10^{-3}$ Torr of vacuum degree. Various raw gases are introduced through gas inlet 25.

A storage chamber 27 is mounted through insulator 26 on reaction chamber 21, and is electrically insulated from reaction chamber 21 by insulator 26. Chamber 27 is partitioned by partition plate 28 from reaction chamber 21. A plurality of supporting rods 29 are inserted to partition plate 28 so that the axes of rods 29 are disposed vertically. Collars 30 are respectively fitted with rods 29 to be fixed to rods 29. Collar 30 is engaged with partition plate 28, so that it does not drop. Gears 32 are respectively engaged with the upper ends of rods 29, and are supported to rods 29 by retainers 31 disposed fixedly under gears 32 in engagement with rods 29. Adjacent gears 32 are engaged with each other. When the central gear is rotatably driven by a driving unit 34, all the gears 32 are rotated to rotate all the rods 29.

Female threads (not shown) are formed on the lower portions of supporting rods 29, and are engaged with male threads (not shown) formed on the upper portions of rod-like supports 33 made of stainless steel to be formed with films on the surfaces, thus fixing supports 33 to rods 29. Driving unit 34 is provided above storage chamber 27, and when gears 32 are rotated by driving unit 34, supports 33 rotate about their axes.

As shown in FIG. 4, supports 33 are aligned in one row substantially at the center in reaction chamber 21. A pair of flat plate-like electrodes 35, 36 are opposed to each other at both sids of the row of supports 33. A number of pores are formed in electrodes 35, 36 to supply gas introduced from inlets 25 to reaction chamber 21 through the pores. Electrodes 35, 36 are electrically connected to chamber 31 to have the same potential as chamber 21. Electrodes 35, 36 are connected through reaction chamber 21 and matching box 37 to high frequency power source 38.

Then, the operation of the apparatus constructed as described above will be described. After a plurality of supports 33 are mounted in reaction chamber 21, supports 33 are rotated around their own axes at a predetermined speed by driving unit 34, and chamber 21 is evacuated to become pressure of approx. $10^{-3}$ Torr. Raw gas is introduced through inlet 35 to chamber 21 while continuously evacuating chamber 21, and pressure in chamber 21 is regulated, for example, to approx. 0.1 to 10 Torr. Then, high frequency power is supplied from power source 38 through matching box 37 to electrodes 35, 36. Thus, since supports 33 are grounded through chamber 27, high frequency discharge occurs between electrodes 33, 36 and supports 33, thereby generating plasma to form thin film containing main component elements in raw gas on supports.

In this case, since the supports are rotated around their own axes, the thin films are uniformly formed on the surfaces of the supports. Since driving means (such as driving unit, gears) for rotatably driving the supports are arranged above the supports, powder is not deposited on the driving means even if the powder is generated in the reaction chamber, thereby readily cleaning the driving means. Since gears 32, rods 29 and collars 30 electrically connected to chamber 27 have the same potential (ground potential) as chamber 27, a discharge is not generated in chamber 27. Reaction chamber 21 to which power from power source 38 is applied is insulated by grounded bottom member 23 and chamber 27, and small insulators 24, 26. Thus, power to be leaked through the insulators is extremely small.

When thin films to be formed are amorphous Si, SiC or SiN, it is preferable to heat supports to 150 to 300° C., while when the films are formed of TiC or TiN, supports are preferably heated to 300 to 650° C. Thus, a lamp heater (not shown) may be provided in chamber 21 to to heat the supports, or $N_2$ gas or Ar gas is introduced into the reaction chamber to heat the supports by the plasma of the gas. In the embodiment described above, the high frequency power source has been used to form the plasma. However, A DC power source may be used to generate a plasma. In this case, the matching box is not required. In the embodiment described above, electrodes 35, 36 have been used to apply the power, and the plasma has been generated to grounded supports 33. However, electrodes 35, 36 may not be provided, but a glow discharge may be generated between reaction chamber 21 and supports 33. Further, a plurality of supports may be arranged in a plurality of rows.

Figure 5:
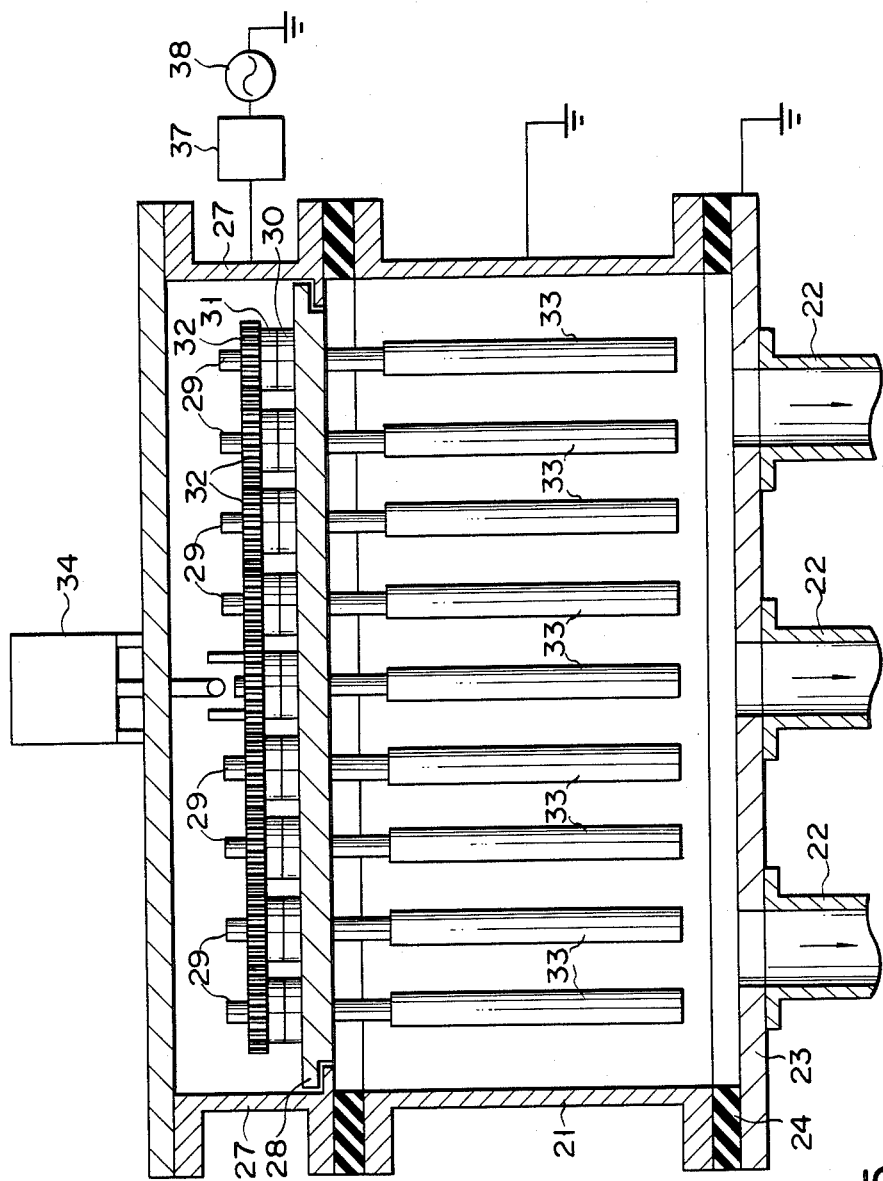
FIGS. 5 and 6 are views showing various modified examples of the ceramic coating apparatus of FIG. 3.

Referring to FIG. 5, another example of a film forming apparatus of ceramics will be described. In FIG. 5, the same reference numerals as FIG. 3 denote the same parts in the other film forming apparatus, and the detailed description thereof will be omitted. In the film forming apparatus, reaction chamber 21 is grounded, and high frequency power source 28 is connected through matching box 37 to storage chamber 27. Thus, high frequency power is applied to supports 33, and a plasma is generated to grounded electrodes 35, 36. This arrangement can be achieved since the reaction chamber and the storage chamber are electrically insulated. Thus, high frequency power is applied to supports 33 to vary the self-bias of the supports, thereby affecting influence to the quality of the films. Accordingly, the film forming apparatuses in FIGS. 3 and 5 may be selected depending on the type of the material to be formed for the thin films.

Figure 6:
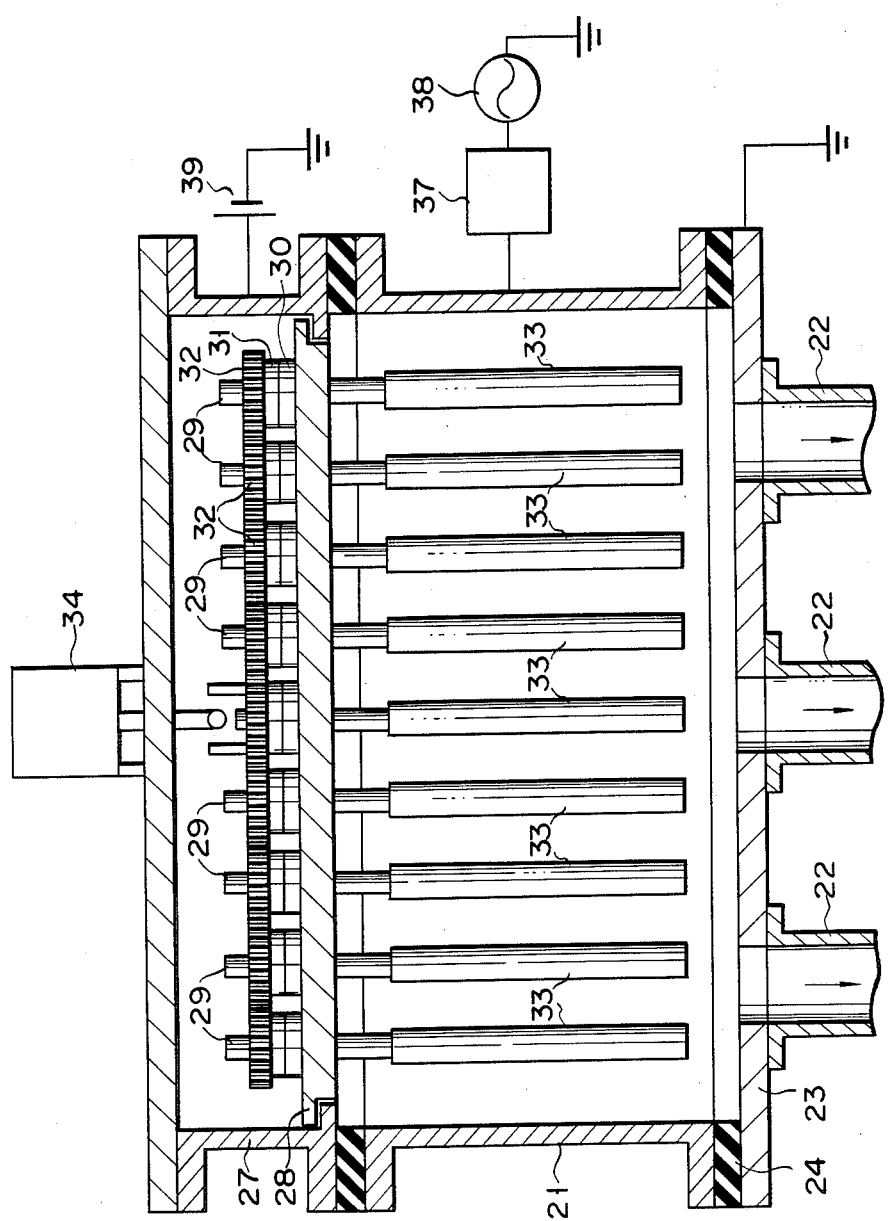

Referring to FIG. 6, still another example of a film forming apparatus will be described. This apparatus is constructed the same as that in FIG. 3 except that a DC power source 39 is connected to storage chamber 27.

Thus, DC power source 39 is connected to vary the self-bias of the supports.

Figure 7:
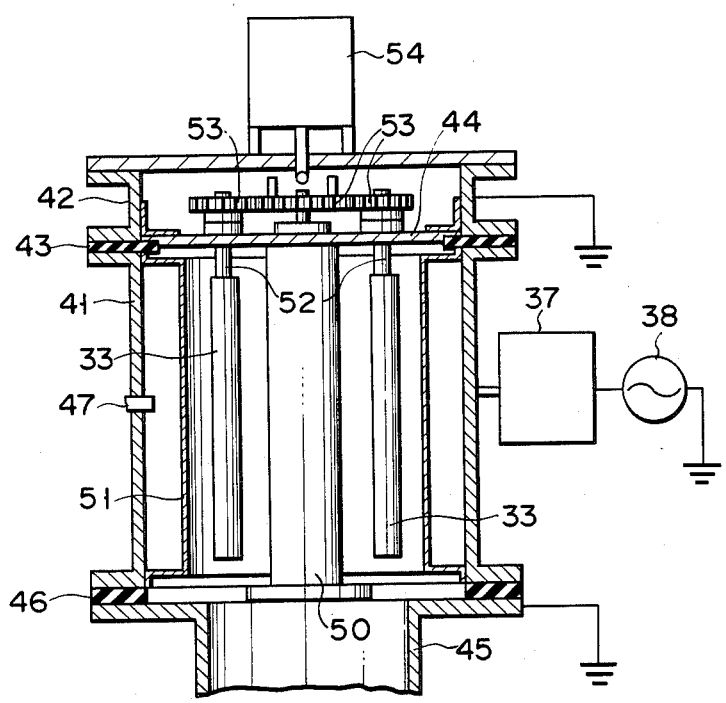
FIG. 7 is a longitudinal sectional view showing a ceramic coating apparatus for manufacturing the dynamic pressure air bearing of the invention, in which shaft members to be coated with the ceramics are arranged on a circumference.
Figure 8:
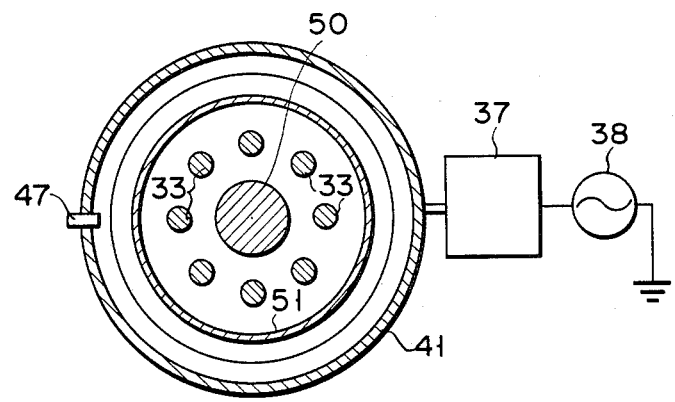
FIG. 8 is a cross-sectional view of FIG. 7.

FIG. 7 is a side sectional view showing still another film forming apparatus, and FIG. 8 is a plan sectional view of the apparatus. In this apparatus, a plurality of supports are arranged circularly to uniformize the film forming velocities on the supports. Reaction chamber 41 is formed in a cylindrical shape, and cylindrical storage chamber 42 is similarly mounted through insulator 43 on reaction chamber 41. Chambers 41 and 42 are partitioned by partition plate 44. Bottom member 45 connected to evacuating means (not shown) is mounted through insulator 46 underneath the bottom of reaction chamber 45. Raw gas is introduced through inlet 47 into reaction chamber 45.

Columnar grounding electrode 50, a plurality of supports 33 and cylindrical high frequency electrode 51 are arranged in chamber 21. Electrode 50 is disposed at the center of chamber 41, and is suspended from partition plate 44. A plurality of supports 33 are arranged circularly about electrode 50, and suspended through supporting rods 52 from partition plate 44. Electrode 51 is disposed coaxially with electrode 50 to be mounted in reaction chamber 41 to be set to the same potential as chamber 41. High frequency power source 38 is connected through matching box 37 to reaction chamber 41 and electrode 51. A number of pores are formed in electrode 51 to supply raw gas introduced through gas inlet 47 into chamber 41 through the pores.

Gears 53 are provided at supports 33 and electrode 50 in storage chamber 42. When gears 53 are rotatably driven by driving unit 54, supports 33 and electrode 50 are rotated about their own axes. The chamber 42 is grounded, and supports 33 and electrode 50 electrically connected to chamber 42 are also grounded.

Thin films are formed on the supports under the same conditions as those of the apparatus in FIG. 3 in the film forming apparatus constructed as described above. Supports 33 and electrode 50 are rotated through gears 53 about their own axes by driving unit 54, reaction pressure is regulated to 0.1 to 10 Torr, and high frequency power is applied to electrode 51. As a result, a plasma is generated in the reaction chamber to form thin films on the surfaces of supports 33.

In this case, supports 33 are arranged under the same geometrical conditions between electrodes 50 and 52. Accordingly, all the supports are formed with films at the same film forming velocities. Since the supports are rotated about their own axes, the thin films are uniformly formed on the surfaces of the supports.

Figure 9:
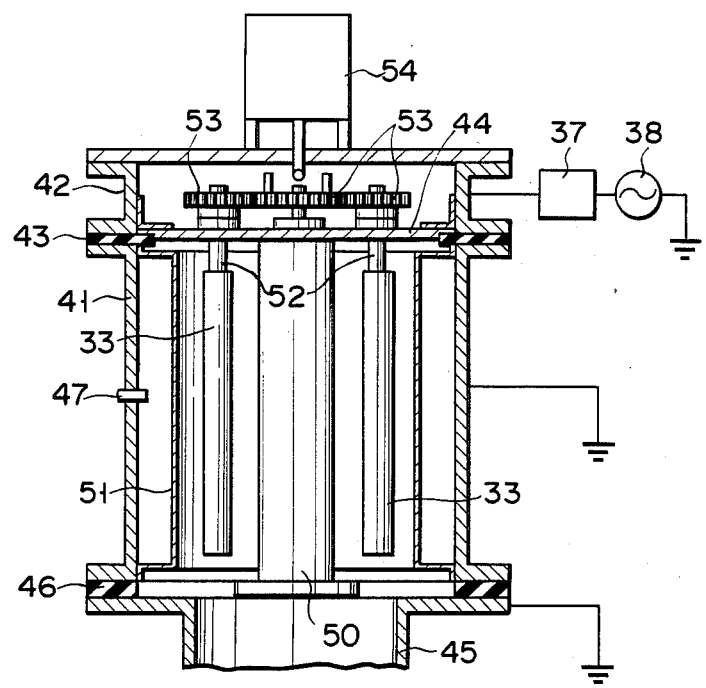
FIGS. 9 and 10 are views showing various modified examples of the ceramic coating apparatus of FIG. 7.

FIG. 9 is a sectional view showing still another example of film forming apparatus. This apparatus is constructed in the same manner as that in FIG. 7 except that reaction chamber 41 is grounded and storage chamber 42 is connected to high frequency power source 38. In this arrangement, self-bias of supports 33 are varied.

Figure 10:
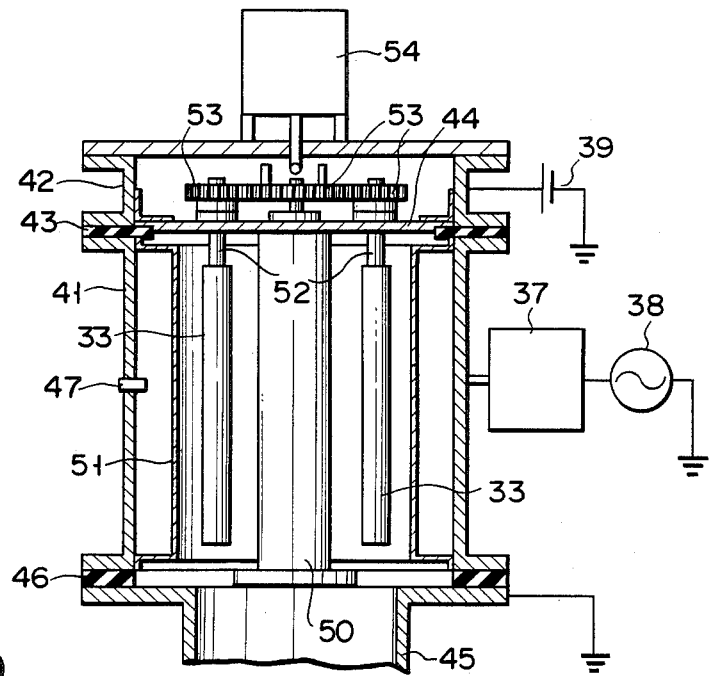

FIG. 10 shows still another example of film forming apparatus. This apparatus is constructed in the same manner as that in FIG. 7 except that DC power source 39 is connected to reaction chamber 42. With this apparatus, self-bias can be varied.

In this apparatus, grounding electrode 50 may be omitted. Electrode 50 has a function for restricting a discharge space, but the grounding electrode is not always necessary. A plurality of supports may be arranged circularly instead of the grounding electrode. In other words, the supports may be arranged along a plurality of concentric circumferences.

According to the film forming apparatus of the examples described above, means for suspending a plurality of supports and means for driving the supports are arranged in the storage chamber. Therefore, even if powder is generated in the reaction chamber, the powder is not raised by the driving means, but thin films of high quality can be stably formed without defects such as pinholes. The by-product is suppressed to be adhered to the driving means, and since the by-product is deposited on the bottom of the reaction chamber, the apparatus can be readily cleaned. The film forming velocities of the respective supports are equalized to form further uniform thin films by disposing the supports along the circumference in the reaction chamber.

Since the storage chamber and the reaction chamber are electrically insulated, the suspending means and the driving means are set to the same potential in the storage chamber. In other words, there are different potential members only in the reaction chamber. Therefore, it can prevent a discharge from generating at positions except the reaction chamber. Since a plasma is generated in an electrically floating reaction chamber, high frequency power to be leaked externally from the reaction chamber is less. The insulator for electrically insulating between the reaction chamber and the storage chamber can be reduced in its area. Therefore, power to be leaked through the insulator is less. Thus, applied high frequency power can be effectively utilized. Since a plurality of supports can simultaneously form thin films, high productivity is provided, and the driving means can be readily cleaned with high maintenance.

Figure 11:
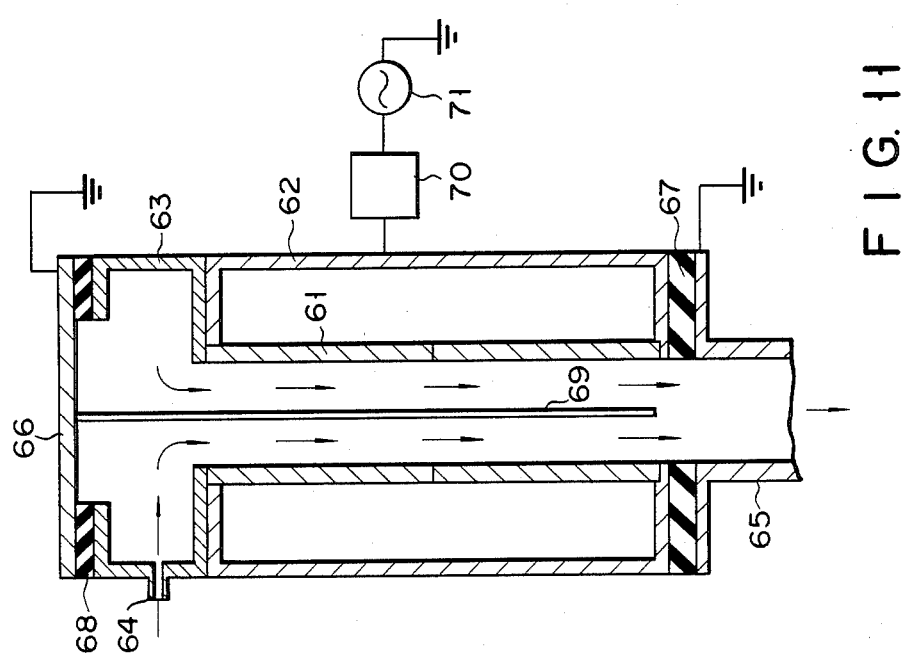
FIG. 11 is a longitudinal sectional view showing a ceramic coating apparatus for coating the inner surface of the sleeve member with ceramics to manufacture the dynamic pressure air bearing of the invention.

Referring to FIG. 11, an apparatus for covering the inner surface of sleeve member 4 with ceramics will be described. Sub-chamber 63 is so arranged on cylindrical reaction vessel 62 as to communicate with reaction chamber 62. Exhaust port 65 is mounted through insulator 67 at the bottom of reaction vessel 62, and is connected to a vacuum pump (not shown). Vessel 62 is evacuated through exhaust port 65 by the vacuum pump. Gas inlet 64 is provided at sub-chamber 63 to thereby introduce raw gas to sub-chamber 63 and vessel 62.

Flat plate-like electrode 66 is so mounted through insulator 68 on the top of sub-chamber 63 as to seal sub-chamber 63. Electrode 66 is grounded, and a rod-like electrode 69 is suspended from the center of electrode 66. Electrode 69 is grounded through electrode 66 to extend to the lower end of vessel 62 at the center of vessel 62. High frequency power source 71 is connected through matching box 70 to vessel 62.

In film forming apparatus constructed as described above, a plurality of sleeve members 61 (two in the shown example) are so arranged in vessel 62 as to coincide at axes with that of vessel 62 and to dispose electrode 69 at the axial center of vessel 62. Raw gas is introduced from gas inlet 64 into vessel 62 while evacuating vessel 62 through exhaust port 65 to hold atmosphere of raw gas at predetermined pressure in vessel 62. Then, when high frequency power is applied from high frequency power source 71 to vessel 62 and sleeve member 61, a plasma is generated between sleeve member 61 and grounded electrode 69 to cover the inner peripheral surface of sleeve member 61 with ceramics mainly containing components of raw gas.

Figure 12:
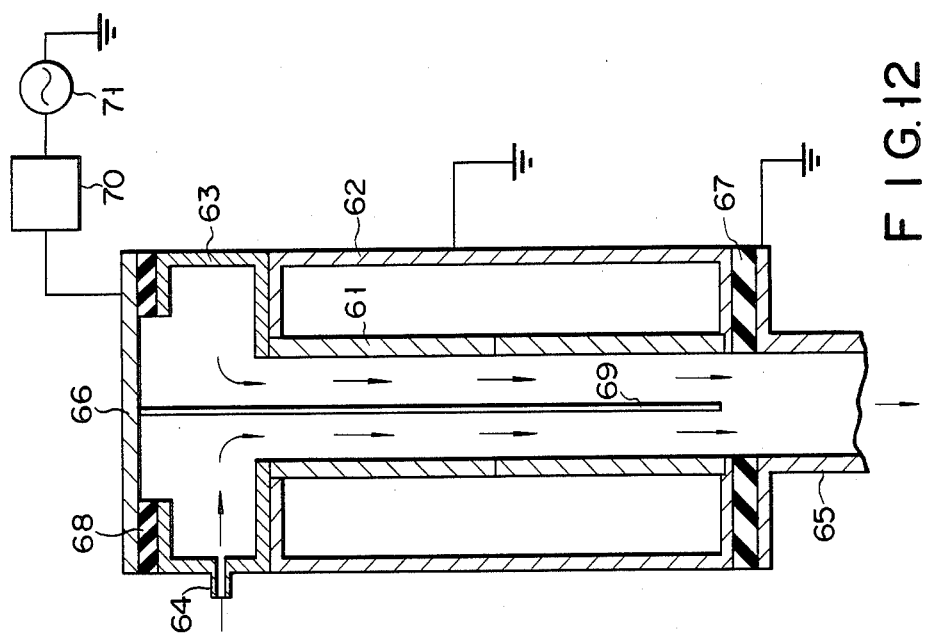
FIG. 12 is a view showing a modified example of the ceramic coating apparatus of FIG. 11.

FIG. 12 shows still another example of film forming apparatus. In this apparatus, reaction vessel 62 is grounded, and electrodes 66, 69 are connected through matching box 70 to high frequency power source 71. In the case of this apparatus, its structure can be simplified as compared with the apparatus in FIG. 11, and electrode 69 inserted into sleeve member 61 is used as a target electrode to cover sleeve member 61 with ceramics by sputtering. For example, sleeve member 61 is covered with SiN on the inner surface by sputtering by using Si rod-like electrode 69 and introducing mixture gas of Ar and $N_2$ into reaction vessel 52. On the other hand, when using Ti rod-like electrode 69, the sleeve member is covered with TiN.

A DC power source may be used instead of the high frequency power source. A number of sleeve members are formed with films simultaneously by disposing a plurality of sleeve members 61 in reaction vessel 62.

Representative examples of film forming conditions of ceramics and thickness of formed ceramic film will be described.

(a) SiN
  $SiH_4$ gas flow rate: 100 SCCM
  $N_2$ gas flow rate: 300 SCCM
  Reaction pressure: 1.0 Torr
  High frequency power: 500 W
  Film forming time 30 min.
  Thickness: Approx. 3 microns (b) SiCN
  $SiH_4$ gas flow rate: 10 SCCM
  $N_2$ gas flow rate: 50 SCCM
  $CH_3$ gas flow rate: 30 SCCM
  Reaction pressure: 1.0 Torr
  High frequency power: 500 W
  Film forming time: 40 min.
  Thickness: Approx. 3 microns.

(c) SiC
  $SiH_4$ gas flow rate: 10 SCCM
  $CH_3$ gas flow rate: 30 SCCM
  Reaction pressure: 1.0 Torr
  High frequency power: 500 W
  Film forming time: 40 min.
  Thickness: Approx. 3 microns.

(d1) SiO
  $SiH_4$ gas flow rate: 10 SCCM
  $O_2$ gas flow rate: 30 SCCM
  Reaction pressure 1.0 Torr
  High frequency power: 500 W
  Film forming time: 40 min.
  Thickness: Approx. 3 microns (e) TiN
  $TiCl_4$ gas flow rate: 10 SCCM
  $N_2$ gas flow rate: 50 SCCM
  $H_2$ gas flow rate: 200 SCCM
  Reaction pressure: 1.0 Torr
  High frequency power: 1 kW
  Film forming time 60 min.
  Thickness: Approx. 3 microns (f) TiC
  $TiCl_4$ gas flow rate: 10 SCCM
  $CH_4$ gas flow rate: 30 SCCM
  $H_2$ gas flow rate: 200 SCCM
  Reaction pressure: 1.0 Torr
  High frequency power: 1 kW
  Film forming time: 60 min.
  Thickness: Approx. 3 microns.

(g) TiCN
  $TiCl_4$ gas flow rate: 10 SCCM
  $CH_4$ gas flow rate: 20 SCCM
  $N_2$ gas flow rate: 50 SCCM
  $H_2$ gas flow rate: 200 SCCM
  Reaction pressure: 1.0 Torr
  High frequency power: 1 kW
  Film forming time: 60 min.
  Thickness: Approx. 3 microns.

(h) BN
  $B_2H_6$ gas flow rate: 10 SCCM
  $N_2$ gas flow rate: 50 SCCM
  Reaction pressure: 1.0 Torr
  High frequency power: 500 W
  Film forming time: 30 min.
  Thickness: Approx. 3 microns.

(i) BC
  $B_2H_6$ gas flow rate: 10 SCCM
  $CH_4$ gas flow rate: 30 SCCM
  Reaction pressure: 1.0 Torr
  High frequency power: 500 W
  Film forming time: 30 min.
  Thickness: Approx. 3 microns.

(j) BCN
  $B_2H_6$ gas flow rate: 10 SCCM
  $CH_4$ gas flow rate: 20 SCCM
  $N_2$ gas flow rate: 50 SCCM
  Reaction pressure: 1.0 Torr
  High frequency power: 500 W
  Film forming time: 30 min.
  Thickness: Approx. 3 microns.

(k) $Al_2O_2$
  $Al(CH_3)_3$ gas flow rate: 10 SCCM
  $H_2$ gas flow rate: 100 SCCM
  $O_2$ gas flow rate: 30 SCCM
  Reaction pressure: 1.0 Torr
  High frequency power: 800 W
  Film forming time: 60 min.
  Thickness: Approx. 3 microns.

(l) WC
  $WF_6$ gas flow rate: 10 SCCM
  $H_2$ gas flow rate: 100 SCCM
  $CH_4$ gas flow rate: 50 SCCM
  Reaction pressure: 1.0 Torr
  High frequency power: 1 kW
  Film forming time: 60 min.
  Thickness: Approx. 3 microns.

(m) Diamond
  $CH_4$ gas flow rate: 50 SCCM
  Reaction pressure: 10 Torr
  High frequency power: 1 kW
  Film forming time: 60 min.
  Thickness: Approx. 3 microns.

When the dynamic pressure air bearing obtained by covering the surface of the fixed shaft mae of stainless steel (SUS416) was used as a laser beam scanner under the above-mentioned conditions, its durability was not deteriorated as compared with the dynamic pressure air bearing formed of carbide alloy to obtain equivalent durability. The working cost of the dynamic pressure air bearing according to the present invention is 1/10 or less of the carbide alloy dynamic pressure air bearing to be inexpensive with high mass productivity.

What is claimed is:

1. A dynamic pressure air bearing comprising a sleeve member, and a shaft member arranged coaxially in the sleeve member, in which air is introduced through a clearance between the sleeve member and the shaft member by the rotation of the sleeve member, dynamic pressure of the introduced air acts on a gap in the inner surface of the sleeve member opposite a gap in the surface of the shaft member, and at least one of the inner surface of the sleeve member and the surface of the shaft member is covered with ceramics, the ceramics covering at least one of the inner surface of the sleeve member and the surface of the shaft member comprises at least one element selected from the group consisting of SiN, SiCN, SiO, TiN, TiC, BN, BC, BCN, Al$_2$O$_3$, WC, and diamond.

2. The dynamic pressure air bearing according to claim 1, wherein the ceramics covering at least one of the inner surface of the sleeve member and the surface of the shaft member comprise at least one element selected from the group consisting of Si, Ti, B, Al, and W and at least one element selected from the group consisting of O, N, and C.

3. The dynamic pressure air bearing according to claim 1, wherein the material of the sleeve member and the shaft member is selected from the group consisting of stainless steel, cast iron, free-cutting steel, and sintered material.

4. The dynamic pressure air bearing according to claim 1, wherein a polygonal mirror is coaxially mounted on said sleeve member, and a light beam incident on the polygonal mirror is reflected and scanned by the polygonal mirror which rotates upon rotation of the sleeve member.

5. A dynamic pressure air bearing comprising a sleeve member, and a shaft member arranged coaxially in the sleeve member, in which said shaft member has an upper dynamic pressure portion and a lower dynamic pressure portion each having a plurality of grooves formed obliquely with respect to the axial direction of the shaft member on the surface of the shaft member, the sleeve member has upper and lower sleeve portions facing the dynamic pressure portions, air is introduced into a clearance between the dynamic pressure portions and the sleeve portions through the grooves, by the rotation of the sleeve member, dynamic pressure of the flowing air acts on the surface of the dynamic pressure portions and the inner surfaces of the sleeve portions, the axial length of the dynamic pressure portions is longer than that of the sleeve portions, at least one of the inner surface of the sleeve member and the surface of the shaft member is covered with ceramics, and said clearance is defined by a gap in the outer shaft surface opposite a gap in the inner sleeve surface, said gaps separating the upper and lower portions.

6. The dynamic pressure air bearing according to claim 5, wherein the clearance between the dynamic pressure portion and the sleeve portion is 2 to 10 microns.

7. The dynamic pressure air bearing according to claim 5, wherein the ceramics covering at least one of the inner surface of the sleeve member and the surface of the shaft member comprise at least one element selected from the grop consisting of Si, Ti, B, Al, and W and at least one element selected from the group consisting of O, N, and C.

8. The dynamic pressure air bearing according to claim 5, wherein the ceramics covering at least one of the inner surface of the sleeve member and the surface of the shaft member comprise at least one element selected from the group consisting of SiN, SiCN, SiC, SiO, TiN, TiC, TiCN, BN, BC, BCN, Al$_2$O$_3$, WC, and diamond.

9. The dynamic pressure air bearing according to claim 5, wherein the ceramics are formed by use of a plasma CVD method.

10. The dynamic pressure air bearing according to claim 5, wherein the material of the sleeve member and the shaft member is selected from a group consisting of stainless steel, cast iron, free-cutting steel, and sintered material.

11. The dynamic pressure air bearing according to claim 5, wherein a polygonal mirror is coaxially mounted on said sleeve member, and a light beam incident on the polygonal mirror is reflected and scanned by the polygonal mirror which rotates upon rotation of the sleeve member.

12. A dynamic pressure air bearing comprising:
a shaft member having an upper dynamic pressure portion and a lower dynamic pressure portion;
a sleeve member coaxially overlapping said shaft member with a first gap between the peripheral surface of said upper and lower dynamic pressure portions and a second gap opposite the first gap and formed in the inner surface of said sleeve member thereby defining a journal bearing of a dynamic pressure type, said journal bearing rotatably supporting said sleeve member by flowing air into the gaps; and
a ceramic coating covering at least one of the peripheral surface of said shaft member and the inner surface of said sleeve member.

13. A dynamic pressure air bearing comprising:
a shaft member having inclined grooves on the peripheral surface of upper and bottom portions thereof;
a sleeve member coaxially overlapping said shaft member with a gap between the peripheral surfaces of the upper and bottom portions of said shaft member and the inner surface of said sleeve member thereby defining journal bearings of a dynamic pressure type, said journal bearings rotatably supporting said sleeve member by flowing air into the gap, and each of the upper and bottom portions of said shaft member having an axial length longer than that of the inner surface defining the journal bearings; and
a ceramics coating covering at least one of the peripheral surface of said shaft member and the inner surface of said sleeve member.

14. A dynamic pressure air bearing comprising a sleeve member, and a shaft member arranged coaxially in the sleeve member, in which air is introduced through a clearance between the sleeve member and the shaft member by the rotation of the sleeve member, dynamic pressure of the introduced air acts on a gap in the inner surface of the sleeve member opposite a gap in the surface of the shaft member, and at least one of the inner surface of the sleeve member and the surface of the shaft member is covered with ceramics, the ceramics being formed by use of a plasma CVC method.

15. The dynamic pressure air bearing according to claim 14, wherein the ceramics covering at least one of the inner surface of the sleeve member and the surface of the shaft member comprise at least one element selected from the group consisting of Si, Ti, B, Al, and W and at least one element selected from the group consisting of O, N, and C.

16. The dynamic pressur air bearing according to claim 14, wherein the material of the sleeve member and the shaft membe is selected from the group consisting of stainless steel, cast iron, free-cutting steel, and sintered material.

17. The dynamic pressure air bearing according to claim 14, wherein a polygonal mirror is coaxially mounted on said sleeve member, and a light beam incident on the polygonal mirror is reflected and scanned by the polygonal mirror which rotates upon rotation of the sleeve member.

* * * * *